No. 724,930. PATENTED APR. 7, 1903.
H. PASSBURG.
APPARATUS FOR MOLDING SUGAR.
APPLICATION FILED SEPT. 10, 1902.
NO MODEL. 2 SHEETS—SHEET 1.

WITNESSES:
Henry J. Suhrbier
Glenn H. Niles

INVENTOR
Heinrich Passburg
BY Goepel & Niles
ATTORNEYS.

No. 724,930. PATENTED APR. 7, 1903.
H. PASSBURG.
APPARATUS FOR MOLDING SUGAR.
APPLICATION FILED SEPT. 10, 1902.
NO MODEL. 2 SHEETS—SHEET 2.

WITNESSES:
INVENTOR
Heinrich Passburg
BY Goepel & Niles
ATTORNEYS.

UNITED STATES PATENT OFFICE.

HEINRICH PASSBURG, OF MOSCOW, RUSSIA.

APPARATUS FOR MOLDING SUGAR.

SPECIFICATION forming part of Letters Patent No. 724,930, dated April 7, 1903.

Application filed September 10, 1902. Serial No. 122,765. (No model.)

*To all whom it may concern:*

Be it known that I, HEINRICH PASSBURG, a citizen of the German Empire, residing at Moscow, in the Empire of Russia, have invented certain new and useful Improvements in Apparatus for Molding Sugar, of which the following is a specification.

The apparatus for covering and drying sugar hitherto used are expensive and time-consuming on account of the multiplicity of parts and operations, and those in which the operations of covering and drying were performed in one apparatus did not become popular owing to the inferior quality of the sugar produced.

This invention relates to apparatus for covering and drying sugar, and has for its object to overcome the disadvantages of the apparatus hitherto in use and to produce a more superior product in a shorter time than heretofore; and for this purpose the invention consists of a plurality of molds, a pipe connecting the ends of the molds, means for rotating the molds and pipe, a stationary pipe below the molds provided with a plurality of openings corresponding to the number of molds, tubes in said openings, means for producing a partial vacuum in the molds and pipe, and troughs or funnels adapted to be placed on the tubes of the stationary pipe depending whether a covering or drying operation is to take place; and the invention consists of certain details of construction and combination of parts, which will be described hereinafter and finally pointed out in the claims.

Figure 1:
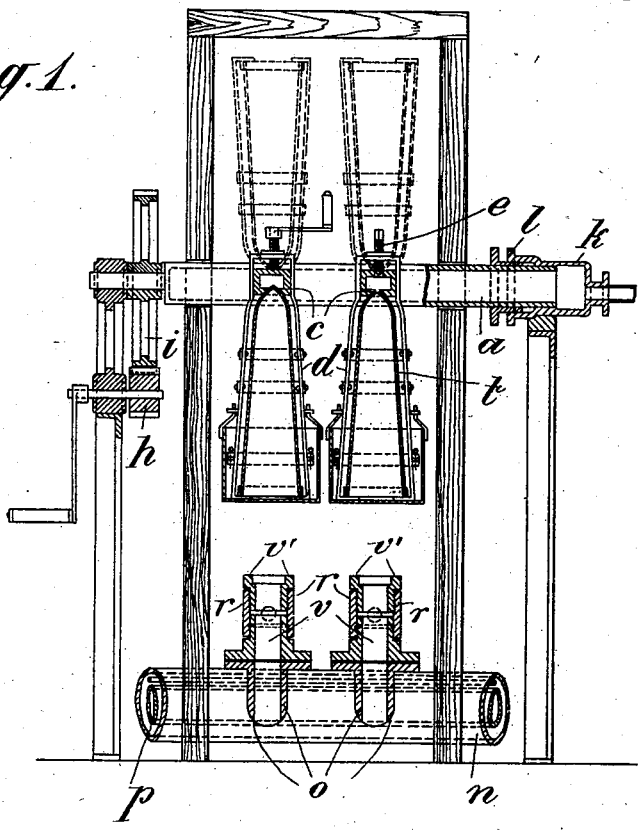
Figure 2:
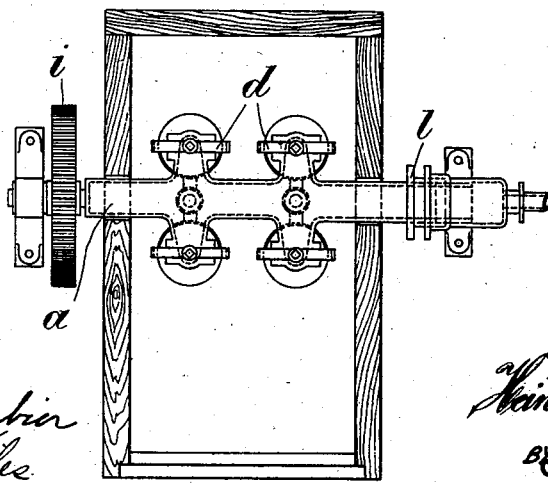
Figure 3:
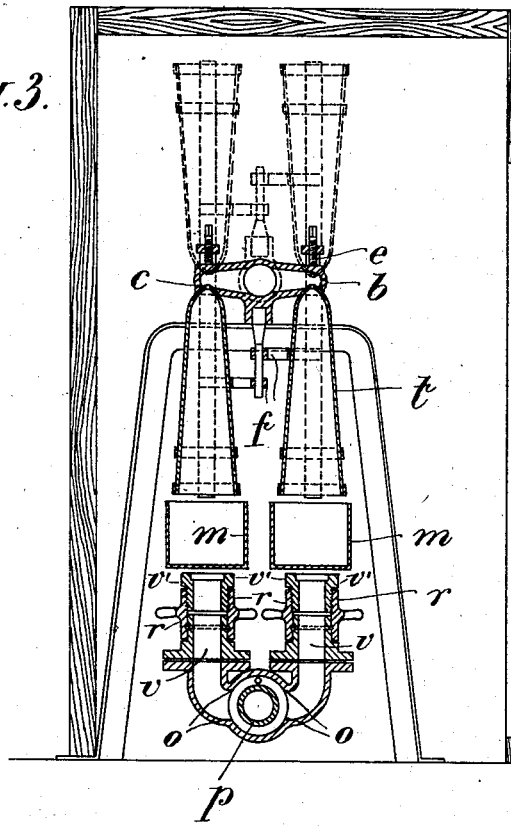
Figure 4:
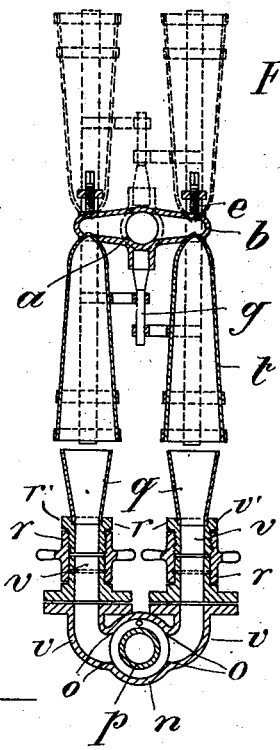
Figure 5:
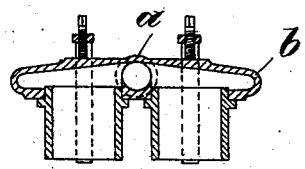

In the accompanying drawings, Figure 1 is a vertical longitudinal section of the apparatus. Fig. 2 is a horizontal section of the same. Fig. 3 is a vertical transverse section showing the trough with covering material placed on the adjustable tubes. Fig. 4 is a vertical transverse section showing the funnels placed on the adjustable tubes when the cooling operation takes place, and Fig. 5 is a vertical transverse detail section showing a pipe adapted for the application of square molds.

Similar letters of reference indicate corresponding parts.

Referring to the drawings, $a$ represents a tube or pipe, which is journaled so as to be easily rotated and provided with laterally-extending short tubes $b$, in which openings $c$ are arranged, which serve for the reception of the top ends of the molds $t$, which are tightened thereto by rubber rings. These openings $c$ are provided at the lower part of the tubes $b$ for the purpose of permitting a passage of the discharge-syrup from the molds to the interior of the pipe $a$, from which it may be easily drawn off. The tubes $b$ serve at the same time, at the opposite side from that in which the openings $c$ are arranged, for the insertion of screws $e$, which hold the hoops $d$ containing the molds, which hoops are stiffened by rings at certain distances apart and are tightly fastened to pipe $a$ for holding the sugar-molds in place. For retaining the molds in their central position on rotating the pipe $a$ there is arranged between the tubes $b$ a socket adapted to receive a rod $g$, which is engaged by rings or holding-rods $f$, as shown in Figs. 3 and 4. The rotating of the pipe $a$ with the molds secured thereto is accomplished by means of a crank which operates the gear-wheels $h$ and $i$. The pipe $a$ is connected with a suction-pump by means of a somewhat larger pipe $k$, which serves at the same time as a bearing for the rotating pipe $a$. A stuffing-box $l$ insures an efficient joint between the pipes. A second pipe, $n$, provided with a plurality of openings or holes $o$, with upwardly-extending tubes $v$ therein corresponding to the number of molds, is arranged at the lower part of the apparatus. These tubes are provided with sleeves $r$ at their upper ends, with handles at their outer and screw-threads at their inner sides. Screw-threaded tubular sockets $v'$ are arranged to fit these sleeves $r$, which sockets may be raised or lowered by the turning of the handles of the sleeves $r$. The pipe $a$ may be connected either with a suction-pump or with a reservoir for filtered air, and for heating the filtered air a steam-pipe $p$ may be arranged in the pipe $n$.

Vessels or troughs $m$, which contain the covering mass, are placed on the adjustable tubular sockets when it is desired to fill the molds with the covering material, as shown in Fig. 3, and funnels $q$ are provided, adapted to be inserted in the adjustable sockets $v'$ and to be raised and lowered therewith. The upper ends of the funnels $q$ are formed cylindrical and so turned that they exactly fit the lower ends of the molds $t$.

The supply of the covering material is accomplished by the vessels $m$ being brought under the molds $t$ and raised, so that the mold is brought close to the walls of the vessel $m$.

When the covering material in the vessel $m$ is sucked almost dry, the vessels may be suspended from the hoops $d$, which are bent inwardly over the end of the mold, as shown in Fig. 1. The vessels may also be placed on the tubular adjustable sockets $v'$, which are arranged below the molds and which may be raised by the turning of the handle, so that the ends of the sugar-molds are always inserted in the covering mass. In Fig. 3, for instance, the vessels $m$ are shown so high that it is only necessary to raise the adjustable tubular sockets $v'$, whereupon the sucking of the covering material may begin. The vessels $m$ as far as possible will permit a sucking in of the desired amount of covering material in the mold, and when the desired amount is sucked in they are again lowered. After the removal of the troughs $m$ the funnels $q$ are placed therein, and by again screwing up of the sockets $v'$ the funnels may be brought close to the molds.

In place of the molds as before described a mold of square section may be substituted, as shown in Fig. 5, which serves for the production of sugar in the form of rods or plates. The molds may be screwed at their openings $c$ to the pipe $a$.

The operation of my improved apparatus is as follows: The molds, with the sugar-juice, are suspended by fastening the same in the opening $c$ to the pipe $a$, as shown in the drawings, and rotating the pipe $a$ until the molds point with their larger ends downwardly. Then the troughs $m$, filled with the covering mass, are placed below the molds and a partial vacuum induced by connecting the pipe $a$ with a suction-pump. The outer atmospheric air will then force the covering-juice into the sugar-mold. The yellow discharge-syrup is thereby expelled from the molds and enters the pipe $a$ through the openings $c$ and is subsequently led to the successive points of treatment. During the suction action and the diminishing of the supply in the troughs $m$ the troughs are continuously screwed upwardly and remain in their position under the mold so long as covering-juice is still in the troughs $m$; but as soon as the whole of the green syrup has entered the sugar in the molds the troughs $m$ are taken off, and the pipe $a$, with the suspended sugar-molds, without removing the latter from their places, is rotated in such a manner that the sugar-molds stand with their wider ends projecting upwardly, as shown in dotted lines in Figs. 1, 3, and 4. In this position the process of covering is completed in a very short time, whereupon the pipe is again rotated, so that the molds assume their original position, and then the drying operation is commenced.

In the drying operation the vacuum in the pipe $a$ is kept up and at the same time a current of heated air is forced through the pipe $n$ into the sugar from underneath. After passing through the sugar the heated air is conducted, together with the moisture, from the pipe $a$ into the suction-pump. If desired, cooled air in place of the previously hot injected air may be forced through the dry sugar for cooling the same. The air may be made to pass through the sugar in an opposite direction than described by connecting a pipe $n$ with the suction-pump and by bringing hot or cold air through the pipe $a$.

Having thus described my invention, I claim as new and desire to secure by Letters Patent—

1. In an apparatus for covering and drying sugar in molds, the combination of a plurality of molds, a pipe connecting the ends of said molds, means for rotating said molds and pipe, and means for producing a partial vacuum in said molds and pipe, substantially as set forth.

2. In an apparatus for covering and drying sugar in molds, the combination, of a plurality of molds, a pipe provided with laterally-extending tubes connecting the ends of said molds, means for rotating said molds and pipe, and means for producing a partial vacuum in said molds and pipe, substantially as set forth.

3. In an apparatus for covering and drying sugar in molds, the combination of a plurality of molds, a pipe connecting the ends of the molds, means for rotating the molds and pipe, means for producing a partial vacuum in said molds and pipe, a second pipe located below said molds and provided with a plurality of openings, tubes extending upwardly from said openings, an interiorly-threaded sleeve on said tubes, having exterior handles, and an adjustable screw-threaded socket adapted to be raised or lowered by the turning of said sleeve, substantially as set forth.

4. In an apparatus for covering and drying sugar in molds, the combination of a plurality of molds, a pipe connecting the ends of the molds, means for producing a partial vacuum in said molds and pipe, means for rotating said molds and pipe, troughs containing covering material, and means for suspending said troughs from the molds, substantially as set forth.

5. In an apparatus for covering and drying sugar in molds, the combination of a plurality of molds, a pipe connecting the ends of the molds, means for producing a partial vacuum in said molds and pipe, means for rotating said molds and pipe, a second pipe below said molds and provided with a plurality of tubes corresponding to the number of molds, funnels on said tubes and adapted to fit said tubes and molds, means for raising said funnels upwardly toward the molds for permitting a continuous current of air to pass through the lower pipe, molds and connecting-pipe, substantially as set forth.

In testimony that I claim the foregoing as my invention I have signed my name in presence of two subscribing witnesses.

HEINRICH PASSBURG.

Witnesses:
GUSTAVE HARLODGE,
HEINRICH DAMMANN.